(12) United States Patent
Niitsuma et al.

(10) Patent No.: US 7,648,096 B2
(45) Date of Patent: Jan. 19, 2010

(54) SPOOL BRAKE DEVICE OF DUAL-BEARING REEL

(75) Inventors: Akira Niitsuma, Sakai (JP); Ken'ichi Kawasaki, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/324,775

(22) Filed: Nov. 26, 2008

(65) Prior Publication Data
US 2009/0166459 A1    Jul. 2, 2009

(30) Foreign Application Priority Data
Dec. 28, 2007   (JP)   .............................. 2007-340399

(51) Int. Cl.
*A01K 89/01* (2006.01)
(52) U.S. Cl. ...................... 242/289; 242/286; 242/288; 242/309
(58) Field of Classification Search ................. 242/286, 242/287, 288, 289, 309
See application file for complete search history.

(56) References Cited
U.S. PATENT DOCUMENTS 5,318,245 A * 6/1994 Sato et al. ................... 242/288
5,692,693 A * 12/1997 Yamaguchi .................. 242/288
6,860,443 B2 * 3/2005 Moosberg .................... 242/286
6,973,999 B2 * 12/2005 Ikuta et al. ................... 188/161
6,983,907 B2 * 1/2006 Ikuta et al. ................... 242/288
7,159,813 B2 * 1/2007 Ikuta et al. ................... 242/289
7,165,737 B2 * 1/2007 Nakagawa et al. .......... 242/288
7,188,793 B2 * 3/2007 Ikuta et al. ................... 242/223

FOREIGN PATENT DOCUMENTS

JP     2001-95443 A     4/2001
JP     2004-208630 A    7/2004

* cited by examiner

*Primary Examiner*—Emmanuel M Marcelo
(74) *Attorney, Agent, or Firm*—Shinjyu Global IP

(57) ABSTRACT

A spool brake mechanism 25 is a device for braking a spool. The spool brake mechanism 25 includes a spool brake member 40 and a control component 55. The control component 55 is configured to control a spool brake member with first braking force. The control component 55 is also configured to control the spool brake member with second braking force when tension detected by a tension detection member becomes equal to or less than a reference tension.

16 Claims, 7 Drawing Sheets

SPOOL BRAKE DEVICE OF DUAL-BEARING REEL

CROSS-REFERENCE TO RELATED APPLICATIONS

This application claims priority under 35 U.S.C. § 119 to Japanese Patent Application No. 2007-340399 filed on Dec. 28, 2007. The entire disclosure of Japanese Patent Application No. 2007-340399 is hereby incorporated herein by reference.

BACKGROUND OF THE INVENTION

1. Field of the Invention

Aspects of the present invention generally relates to a brake device, and more specifically, the present invention relates to a spool brake device of a dual-bearing reel for braking a spool rotatably mounted to a reel unit.

2. Background Information

A bait-casting reel is a sort of a dual-bearing reel for performing casting while a fishing gear (e.g., terminal tackle) is mounted to the tip of a fishing line. The dual bearing reel, especially, the bait-casting reel is provided with a spool brake device for braking spool. The spool brake device prevents backlash in casting. Conventionally, a mechanical spool brake device has been used as the spool brake device. Examples of the mechanical spool brake device are a centrifugal type spool brake device with use of centrifugal force and a magnetic type spool brake device with use of an eddy current generated by a magnet.

Japanese Patent Application Publication No. JP-A-2001-095443 discloses a mechanical spool brake device. The mechanical spool brake device is configured to regulate the strength of the braking force applied to a spool with a regulation dial. Here, the regulation dial is mounted to a lateral side of a reel unit. Specifically, the regulation dial is arranged on the opposite side of the handle attachment side.

However, the mechanical spool brake device is not allowed to arbitrarily control the braking force during casting. In response to this, Japanese Patent Application Publication No. JP-A-2004-208630 discloses a spool brake device for electrically controlling the braking force to be applied to a spool. The conventional electrically-controllable spool brake device of a dual bearing reel is provided with a power generation mechanism. The power generation mechanism is made up of a magnet and a coil. The power generation mechanism is arranged between a spool and a reel unit. The spool brake device is configured to regulate the braking force during casting by electrically controlling the power generation mechanism.

Also, the conventional electrically-controllable spool brake device includes a magnet, a coil, tension detection means, and a control mechanism. The magnet is mounted to a spool, and the coil is mounted to a reel unit. The tension detection means detects tension to be applied to a fishing line. The control mechanism is configured to determine a start-timing of braking the spool based on the detected tension and control electric current passing through the coil. In addition, the conventional spool brake device is configured to detect change of tension from the starting of casting. When the tension becomes equal to or less than a predetermined value, the spool brake device is configured to control the braking force with a braking pattern for gradually reducing the braking force.

Moreover, the conventional spool brake device is provided with a regulation dial for controlling strength of the braking force to be applied to a spool. The regulation dial is mounted to a lateral surface of a reel unit. More specifically, the regulation dial is arranged on the opposite side from a handle attachment side. Also, the strength of the braking force is controlled with a plurality of levels. For example, eight-level braking force is allowed to be set with the regulation dial. The eight-level braking pattern is set by shifting a benchmark braking pattern in a direction of increasing/decreasing the braking force.

According to the above-mentioned mechanical and electrically-controllable spool brake devices, the strength of the braking force is controlled by operating the regulation dial depending on a fishing condition (e.g., weight of a terminal tackle and a wind direction on a fishing site). Then, the best setting for maximizing the flying distance of a terminal tackle will be found while the regulating dial is operated. However, if a fishing condition is changed as a result of changes of the terminal tackle's weight and the wind direction, the flying distance will be changed accordingly. Therefore, the conventional spool brake device is required to reset the strength of the braking force by operating the regulation dial every time a fishing condition is changed.

In view of the above, it will be apparent to those skilled in the art from this disclosure that there exists a need for an improved spool brake device. This invention addresses this need in the art as well as other needs, which will become apparent to those skilled in the art from this disclosure.

SUMMARY OF THE INVENTION

Accordingly, aspects of the present invention have been created to solve the above-mentioned problems occurring in the conventional practice, and to provide a spool brake device for coping with a certain degree of changes of a fishing condition without resetting the strength of the braking force.

According to one aspect of the present invention, a spool brake device of a dual-bearing reel is configured to brake a spool. The spool is rotatably mounted to a reel unit. The spool is also capable of winding a fishing line around its periphery. The spool brake device includes a spool brake portion, a first braking force setting portion, a tension setting portion, a tension detection portion, a second braking force setting portion, and a spool control portion. The spool brake portion is configured to electrically-controllably brake the spool. The first braking force setting portion is configured to set first braking force to be reduced with elapsed time. The tension setting portion is configured to set reference tension. The tension detection portion is configured to detect tension to be applied to the fishing line. The second braking force setting portion is configured to set second braking force by multiplying the first braking force. The spool control portion is configured to control the spool brake portion with the first brake force at the start of braking. Also, the spool control portion is configured to control the spool brake portion with the second braking force when tension detected by the tension detection portion becomes equal to or less than the reference tension after the start of braking.

According to the spool brake device, tension to be applied to the fishing line is detected when the fishing line is released from the spool. Then, the spool is braked with the first braking force. When the detected tension becomes equal to or less than the reference tension after the start of braking the spool with the first braking force, the spool is braked with the second braking force. The second braking force is generated by multiplying the first braking force.

According to the spool brake device, the spool is braked with the second braking force generated by multiplying the first braking force when the detected tension becomes equal to or less than the preliminarily set reference tension. In this case, when a relatively strong tension is always applied to the fishing line, frequency that the detected tension exceeds the reference tension will be high. Accordingly, the spool is often braked only with the first braking force. For example, when a heavy tackle is used or when a fishing site is in a downwind condition, the spool is braked with weak braking force. Also, when weak braking force is applied to the spool, frequency that the detected tension becomes equal to or less than the reference tension. Accordingly, the spool is often braked with the relatively strong second braking force. For example, when a light tackle is used or when a fishing site is in an upwind condition, the spool is braked with strong braking force.

As described above, when the detected tension exceeds the reference tension, the spool is braked with weak first braking force. On the other hand, when the detected tension becomes equal to or less than the reference tension, the spool is braked with the second braking force generated by multiplying the first braking force. Therefore, strength of the braking force is automatically controlled depending on a fishing condition. In other words, even if a fishing condition changes to some extent, strength of the braking force is not required to be reset.

According to another aspect of the present invention, the spool brake device further includes a timer portion. The timer portion is configured to start counting when the detected tension becomes equal to or less than the reference tension. Also, the spool control portion is configured to control the spool brake portion with the second braking force when the timer portion finishes counting. In this case, a condition of tension will be monitored from the start to the end of counting by the timer portion. When the detected tension exceeds the reference tension until the timer portion finishes counting, the spool is braked with the first braking force as it is.

In this case, when the detected tension becomes equal to or less than the reference tension, the spool is not immediately braked with the strong second braking force but suspended to be braked until the timer portion finishes counting. Therefore, frequency of braking the spool with the second braking force will be reduced, and phenomena that the spool is often braked with the string braking force will not easily produced. Accordingly, it is possible to further prolong flying distance of a tackle.

According to yet another aspect of the present invention, a first timer value counted by the timer portion after casting is less than second and subsequent timer values counted by the timer portion. In this case, if the spool is braked with the second braking force when the timer portion counts the second and subsequent timer values, a period of time when the spool is suspended to be braked will be longer than a period of time when the spool is suspended to be braked when the timer portion counts the first timer value. Therefore, phenomena that the spool is braked with the strong second braking force will not be easily produced. Accordingly, it is possible to further prolong flying distance of a tackle.

According to another aspect of the present invention, the spool brake device further includes a velocity detection portion. The velocity detection portion is configured to detect rotational velocity of the spool. Also, the spool control portion is configured to reduce the first braking force in conjunction with reduction of the rotational velocity detected by the velocity detection portion. In this case, the first braking force is reduced in conjunction with the rotational velocity. Therefore, it is possible to fit the configuration to a braking property of a magnet type braking device or centrifugal type braking device by setting reduction rate of the braking force.

According to yet another aspect of the present invention, the spool control portion is configured to reduce the first braking force in proportion to the square of the detected rotational velocity. In this case, the first braking force is reduced in proportion to the square of the rotational velocity of the spool. Therefore, it is possible to realize the first braking force fit for a property of the centrifugal braking device.

According to another aspect of the present invention, the spool control portion is configured to start controlling the spool brake portion when the detected tension becomes equal to or less than a predetermined value. In this case, the detected tension is reduced as the spool's rotation is gradually increased from the start of casting, and braking of the spool is started when the detected tension becomes equal to or less than a predetermined value. Therefore, it is possible to brake the spool before the spool's rotation is maximized (i.e., before the detected tension becomes approximately zero). Accordingly, it is possible to reliably prevent the fishing line's sag. Also, it is possible to stably cast a tackle.

According to a further another aspect of the present invention, the spool control portion is configured to reduce the reference tension in conjunction with reduction of the detected rotational velocity. In this case, the reference tension is reduced in conjunction with the rotational velocity to be reduced after casting. Therefore, it is possible to set the reference tension in accordance with the detected tension to be reduced with the elapsed time of casting.

According to still a further aspect of the present invention, the first braking force setting portion and the second braking force setting portion are capable of setting a plurality of first braking forces and a plurality of second breaking forces, respectively. The plurality of first braking forces are different from each other, and the plurality of second braking forces are also different from each other. Also, the spool brake device further includes a braking force selection portion. The braking force selection portion is configured to select one of a plurality of combinations formed by selecting one of the plurality of first braking forces and one of the plurality of second braking forces. In this case, for example, it is possible to change the first braking force and the second braking force depending on a condition (e.g., fishing line's type). Therefore, it is possible to optimally prolong flying distance of a tackle depending on such a condition.

According to yet a further aspect of the present invention, the reference tension setting portion is capable of setting a plurality of reference tensions depending on the plurality of first braking forces. In this case, it is possible to change the reference tension depending on a condition (e.g., fishing line's type). Therefore, it is possible to further optimally prolong flying distance of a tackle depending on such as condition.

According to another aspect of the present invention, the spool brake device further includes a damping rate setting portion. The damping rate setting portion is configured to set temporal damping rate of the second braking force. Also, the spool control portion is configured to reduce the second braking force at the set damping rate in accordance with time to be elapsed after the timer portion finishes counting. In this case, the second braking force is damped. Therefore, it is possible to further prolong flying distance of a tackle by arbitrarily selecting the damping date (i.e., by reducing a period of time when the strong braking force is applied to the spool).

According to yet another aspect of the present invention, the spool brake device is configured to brake a spool. Here, the spool is rotatably mounted to a reel unit, and is capable of winding a fishing line around its periphery. The spool brake device of the eleventh aspect includes a first spool brake portion, a second spool brake portion, a tension setting portion, a tension detection portion, a second braking force setting portion, and a spool control portion. The first spool brake portion is configured to brake the spool with first braking force in conjunction with rotation per unit time of the spool. The second spool brake portion is configured to brake the spool with electrically-controllable second braking force. The tension setting portion is configured to set reference tension. The tension detection portion is configured to detect tension to be applied to the fishing line. The second braking force setting portion is configured to set the second braking force generated by multiplying the first braking force. The spool control portion is configured to control the second spool brake portion with the second brake force when tension detected by the tension detection portion becomes equal to or less than the reference tension.

According to the spool brake device, the spool is braked with the second braking force (by the second spool brake portion) in addition to the first braking force (by the first spool brake portion) when the detected tension becomes equal to or less than a preliminarily set reference tension. Therefore, when a relatively strong tension is always applied to the fishing line, frequency that the detected tension exceeds the reference tension will be high. Accordingly, the spool will be often braked only with the first braking force. For example, when a heavy tackle is used or when a fishing site is in a downwind condition, the spool is braked with weak braking force. On the other hand, when weak tension is applied to the fishing line, frequency that the detected tension becomes equal to or less than the reference tension will be high. Accordingly, the spool will be often braked with the first and second braking forces. For example, when a light tackle is used or when a fishing site is in an upwind condition, the spool is braked with strong braking force.

In this case, when the detected tension exceeds the reference tension, the spool is caused to brake with the weak first braking force. On the other hand, when the detected tension becomes equal to or less than the reference tension, the spool is caused to brake with the first and second braking forces. Therefore, strength of the braking force is automatically controlled depending on a fishing condition. In other words, even if a fishing condition changes to some extent, strength of the braking force is not required to be reset.

According to still another aspect of the present invention, the first spool brake portion includes a brake shoe and a brake drum. The brake shoe is capable of integrally rotating with the spool. Also, the brake shoe is capable of radially moving outward by means of centrifugal force to be generated by rotation of the spool. The brake drum is arranged on the outer peripheral side of the brake shoe in the reel unit. Also, the brake drum is capable of making contact with the brake shoe. In this case, when the first braking force is applied to the spool, it is possible to brake the spool with the braking force in proportion to the square of the rotational velocity of the spool with use of the centrifugal force.

According to the present invention, the spool is caused to brake with the first braking force (i.e., weak braking force) when the detected tension exceeds a predetermined tension. Also, the spool is caused to brake with the second braking force generated by multiplying the first baking force by a predetermined scale factor when the detected tension becomes equal to or less than the predetermined tension. Therefore, strength of the braking force will be controlled depending on a fishing condition. Accordingly, it is not necessary to reset strength of the braking force even if a fishing condition is changed to some extent.

These features, aspects and advantages of the present invention will become apparent to those skilled in the art from the following detailed description, which, taken in conjunction with the annexed drawings, disclose embodiments of the present invention.

BRIEF DESCRIPTION OF THE DRAWINGS

Referring now to the attached drawings which form a part of this original disclosure.

DETAILED DESCRIPTION OF THE EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Reel Configuration

Figure 1:
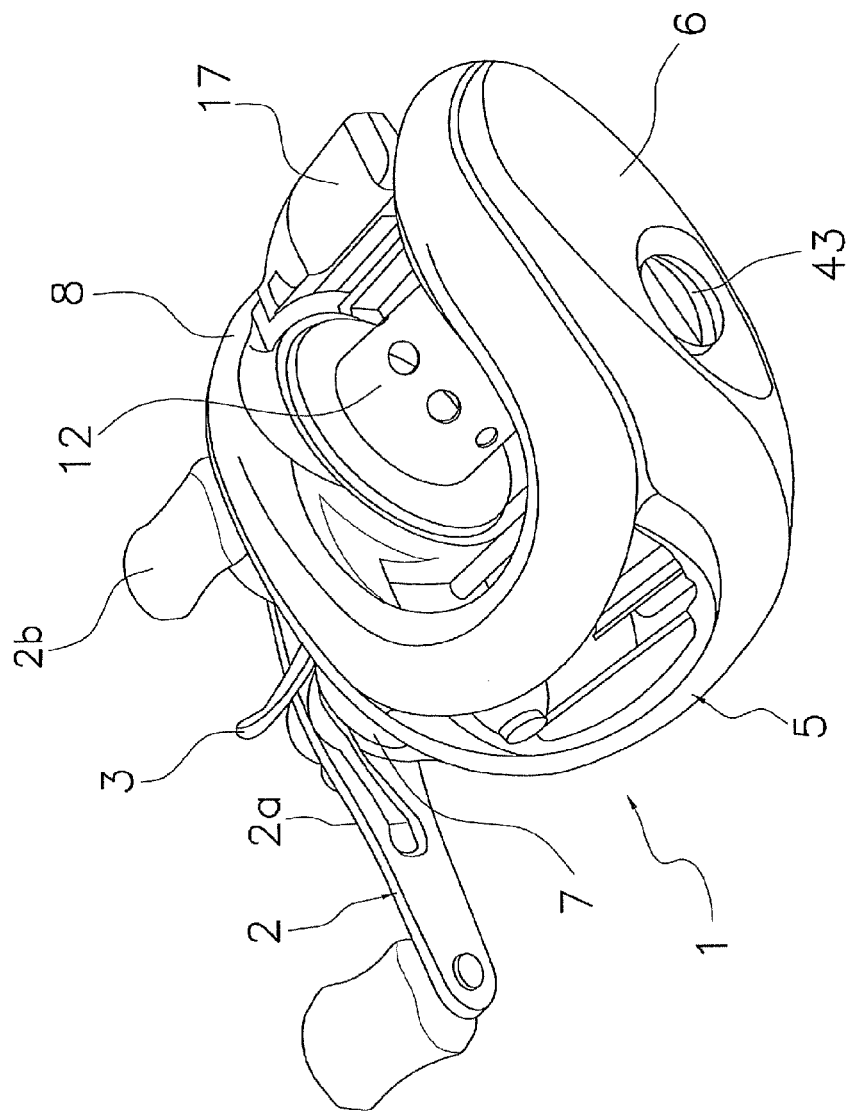
FIG. 1 is a perspective view of a dual-bearing reel that an embodiment of the present invention is applied.
Figure 2:
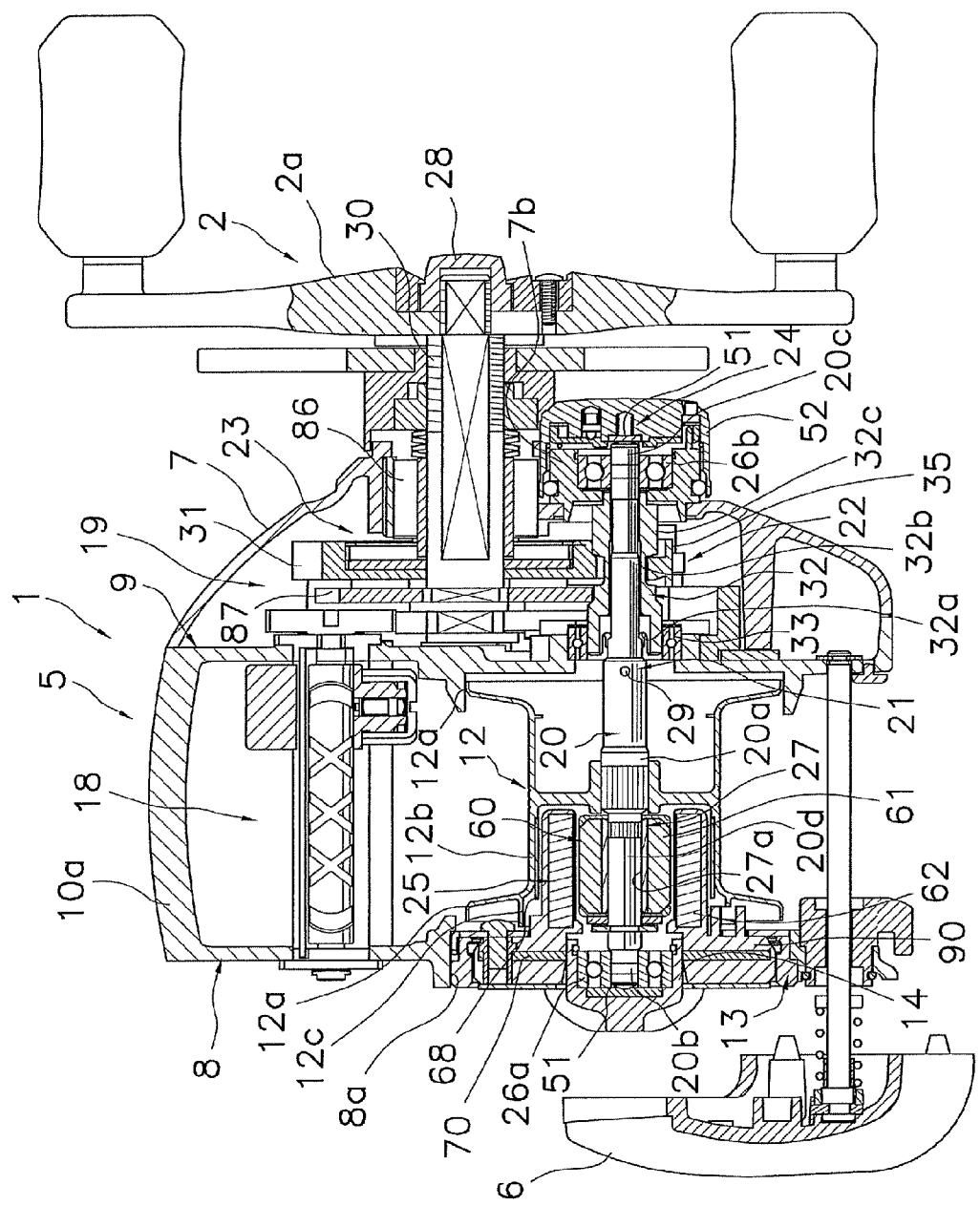
FIG. 2 is a cross-sectional view for illustrating the internal structure of a reel unit of the dual-bearing reel.

Referring initially to FIGS. 1 and 2, a dual-bearing reel is illustrate in accordance with a first embodiment of the present invention. The dual-bearing reel is a low-profile dual-bearing reel for bait casting. The dual-bearing reel includes a reel unit 1, a handle 2, and a star drag 3. The handle 2 is attached to a lateral side of the reel unit 1 for rotating a spool. The star drag 3 is attached to e the handle 2 side of the reel unit for regulating the drag force.

The handle 2 is a double-handle including an arm 2a and two knobs 2b. The knobs 2b are rotatably mounted to the both ends of the arm 2a. As illustrated in FIG. 2, the arm 2a is non-rotatably mounted to the tip of a handle shaft 30. Specifically, the arm 2a is firmly connected to the handle shaft 30 by means of a nut 28.

The reel unit 1 is made of light metal (e.g., magnesium alloy). The reel unit 1 includes a flame 5, a first side cover 6, and a second side cover 7. The first and second side covers 6 and 7 are mounted to the both lateral sides of the flame 5. Also, a spool 12 is rotatably mounted to the interior of the reel unit 1 through a spool shaft 20 (see FIG. 2). The spool 12 is used for winding the fishing line around its periphery.

As illustrated in FIG. 2, the flame 5 accommodates the spool 12, a clutch lever 17 (see FIG. 1), and a level-winding mechanism 18. The clutch lever 17 functions as a pad for the thumb of an angler when "a thumbing operation" is performed. The level-winding mechanism 18 is used for uniformly winding the fishing line around the spool 12. Also, a gear mechanism 19, a clutch mechanism 21, a clutch control mechanism 22, a drag mechanism 23, and a casting control mechanism 24 are arranged between the flame 5 and the second side cover 7. The gear mechanism 19 is configured to transmit rotational force from the handle 2 to the spool 12 and the level-winding mechanism 18. The clutch mechanism 21 is configured to couple/uncouple the spool 12 and the handle 2. The clutch control mechanism 22 is configured to control the clutch mechanism 21 in accordance with an operation of the clutch lever 17. The drag mechanism 23 is configured to brake the spool 12. The casting control mechanism 24 is configured to regulate drag force to be generated when the spool 12 rotates. Also, an electric-control brake mechanism 25 (an example of a spool brake device) is arranged between the flame 5 and the first side cover 6 for inhibiting backlash in casting.

The flame 5 includes a pair of side plates 8 and 9, and a plurality of coupling portions 10a. The side plates 8 and 9 are opposed to each other through a predetermined gap. The coupling portions 10a integrally connect the side plates 8 and 9. A circular opening 8a is formed in the side plate 8. A spool support portion 13 is detachably fixed to the opening 8a. The spool support portion 13 forms a part of the reel unit 1. The spool support portion 13 is provided with a bearing accommodating portion 14. The bearing accommodating portion 14 accommodates a bearing 26a. The bearing 26a supports an end of the spool 12. Also, the spool support portion 13 includes a male threaded portion. The male threaded portion is screwed into a female threaded portion formed in the opening 8a. Thus, the spool support portion 13 is firmly screwed into the opening 8a.

The spool 12 includes dish-shaped flange portions 12a on its both ends. The spool 12 also includes a tubular bobbin trunk 12b between the both flange portions 12a. The outer peripheral surface of the left-side flange portion 12a in FIG. 2 is separated from the inner peripheral side of the opening 8a through a slight gap for preventing jamming of the fishing line. For example, the spool 12 is non-rotatably fixed to the spool shaft 20 penetrating the inner peripheral side of the bobbin trunk 12b by means of the serration coupling.

Also, the spool shaft 20 is made of non-magnetic metal (e.g., SUS304). The spool shaft 20 penetrates the side plate 9, and extends outward of the second side cover 7. The extended end is rotatably supported by the boss 7b mounted to the second side cover 7 through a bearing 26b. The other end of the spool shaft 20 is rotatably supported through the bearing 26a. The spool shaft 20 includes a large-diameter portion 20a in its intermediate part, and includes small-diameter portions 20b and 20c in its ends. Here, the small-diameter portions 20b and 20c are supported by the bearings 26a and 26b, respectively. The bearings 26a and 26b are rolling bearings. The bearings 26a and 26b include a rolling member, an inner ring, and an outer ring, respectively. These members are made of SUS404, and their surfaces are modified for improving corrosion resistance of the bearings 26a and 26b.

Furthermore, as illustrated in left side of FIG. 2, the spool shaft 20 includes a magnet attachment portion 20d between the small-diameter portion 20b and the large-diameter portion 20a. The outer diameter of the magnet attachment portion 20d is larger than that of the small-diameter portion 20b and is smaller than that of the large-diameter portion 20a. After-mentioned magnets 61 are mounted to the magnet attachment portion 20d. Also, a magnet holding portion 27 is non-rotatably fixed to the magnet attachment portion 20d by the serration coupling. For example, the magnet holding portion 27 is made of magnetic substance obtained by performing the electroless nickel plating with respect to the surface of steel material (e.g., SUM (cutting and extrusion)). The magnet holding portion 27 is a rectangular prism, and its cross-section is formed in a square shape. The magnet holding portion 27 includes a through hole 27a in its center part. The magnet attachment portion 20d penetrates the through hole 27a. Here, a fixing method of the magnet holding portion 27 is not limited to the serration coupling. A variety of coupling methods (e.g., the key coupling and the splined coupling) are allowed to be used as the fixing method.

The right end of the large-diameter portion 20a of the spool shaft 20 is arranged in the opening portion of the side plate 9. An engaging pin 29 is fixed to the right end of the large-diameter portion 20a. The engaging pin 29 forms a part of the clutch mechanism 21. Also, the engaging pin 29 penetrates the large-diameter portion 20a along its diameter. The both ends of the engaging pin 29 are radially protruded from the large-diameter portion 20a.

As illustrated in FIG. 1, the clutch lever 17 is arranged behind the spool 12 while arranged between the pair of side plates 8 and 9. The clutch lever 17 is coupled to the clutch control mechanism 22. The clutch lever 17 is configured to be slid up and down between the pair of side plates 8 and 9 for switching the clutch mechanism 21 between a coupled state and an uncoupled state.

The gear mechanism 19 includes the handle shaft 30, a main gear 31, and a pinion gear 32. The main gear 31 is fixed to the handle shaft 30. The pinion gear 32 is formed in a tubular shape, and is meshed with the main gear 31. The handle shaft 30 is rotatably mounted to the side plate 9 and the second side cover 7. The handle shaft 30 is prevented from rotating in a line-releasing direction (i.e., reversing) by a roller-type one-way clutch 86 and a pawl-type one-way clutch 87. The one-way clutch 86 is mounted between the second side cover 7 and the handle shaft 30. The main gear 31 is rotatably coupled to the handle shaft 30 through the drag mechanism 23.

The pinion gear 32 is formed in a tubular shape, and is extended from the outside of the side plate 9 to its inside. The spool shaft 20 penetrates the center part of the pinion gear 32. The pinion gear 32 is axially-movably mounted to the spool shaft 20. Also, the left end of the pinion gear 32 in FIG. 2 is rotatably and axially-movably supported by the side plate 9 through a bearing 33. Furthermore, a mesh groove 32a is formed on the left end of the pinion gear 32 in FIG. 2. The mesh groove 32a is meshed with the engaging pin 29. The mesh groove 32a and the engaging pin 29 form the clutch mechanism 21. Furthermore, a constricted portion 32b is formed in the intermediate part of the pinion gear 32, and a gear portion 32c is formed in the right end of the pinion gear 32. The gear portion 32c is meshed with the main gear 31.

The clutch control mechanism 22 includes a clutch yoke 35. The clutch yoke 35 moves along the spool shaft 20. In addition, the clutch control mechanism 22 includes a clutch return mechanism (not illustrated in the figure). The clutch return mechanism is configured to switch the clutch mechanism 21 from an off-state to an on-state in conjunction with rotation of the spool 12 in the line-winding direction.

The casting control mechanism 24 includes a plurality of friction plates 51 and a brake cap 52. The friction plates 51 are arranged for holding and inwardly pressing the both ends of the spool shaft 20. The brake cap 52 is configured to regulate the force of the friction plates 51 for holding and inwardly pressing the spool shaft 20. The left friction plate 51 (see FIG. 2) is mounted to the interior of the spool support portion 13.

Spool Brake Mechanism Configuration

Figure 3:
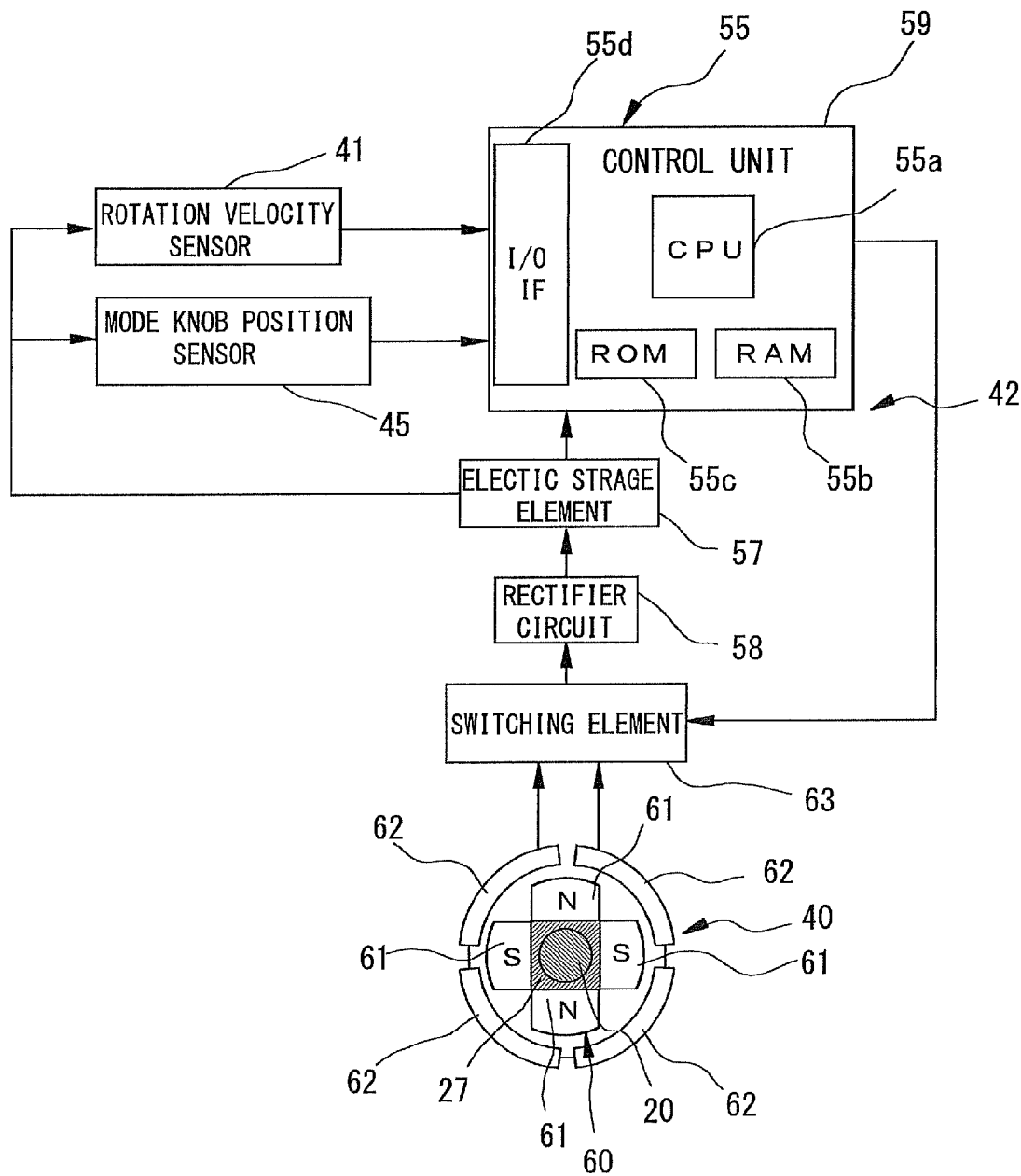
FIG. 3 is a block diagram for illustrating the configuration of a spool brake device of the dual-bearing reel.

As illustrated in FIG. 3, a spool brake mechanism 25 (an example of spool brake device) includes a spool brake unit 40, a rotation velocity sensor 41, a spool control unit 42, and a mode knob 43. The spool brake unit 40 (an example of a spool brake portion) is provided for the spool 12 and the reel unit 1.

The rotation velocity sensor 41 (an example of a velocity detection portion) is configured to detect tension to be applied to the fishing line. The spool control unit 42 is configured to electrically control the spool brake unit 40 with one of the after-mentioned four brake modes. The mode knob 43 (an example of a braking force selection portion) is used for selecting one of the four brake modes.

The spool brake unit 40 is capable of electrically braking the spool 12 by way of electric generation. The spool brake unit 40 includes a rotor 60, a plurality of (e.g., four) coils 62, and a switching element 63. The rotor 60 includes a plurality of (e.g., four) magnets 61. The magnets 61 are arranged along the rotational direction of the spool shaft 20. The coils 62 are arranged on the outer peripheral side of the rotor 60, and are opposed to each other. Also, the coils 62 are series-connected. The switching element 63 is connected to the both ends of the plurality of series-connected coils 62. The spool brake unit 40 is configured to brake the spool 12 by changing a duty cycle. The duty cycle is changed when the switching element 63 switches the electric current generated by the relative rotation of the magnets 61 and the coils 62 between on and off. The longer a period of time when the switching element 63 is in the on-state (i.e., the longer the duty cycle), the stronger the braking force to be generated by the spool brake unit 40.

Four magnets 61 are arranged in the peripheral direction of the rotor 60. Polarities of the adjacent magnets 61 are different from each other. The length of the magnet 61 is approximately the same as that of the magnet holding portion 27. The inner surface of the magnet 61 is flat, but the cross-section of its outer surface is formed as a circular-arc. The inner surface makes contact with the outer peripheral surface of the magnet holding portion 27 of the spool shaft 20.

As illustrated in FIG. 2, a sleeve 68 is mounted to the inner peripheral surface of the bobbin trunk 12b. The sleeve 68 is opposed to the magnets 61. For example, the sleeve 68 is a magnetic member formed by performing the electroless nickel plating with respect to the surface of steel material (e.g., SUM (extrusion and cutting)). The sleeve 68 is fixed to the inner peripheral surface of the bobbin trunk 12b by arbitrary fixing means (e.g., press-fitting or bonding). When the magnetic sleeve 68 is opposed to the magnets 61, the magnetic flax from the magnets 61 concentrates in and passes through the coils 62. Accordingly, electric generation efficiency and brake efficiency will be enhanced.

Coreless coils are used as the coils 62 for preventing cogging. When cogging is prevented, the spool 12 smoothly rotates. Furthermore, the coils 62 are not provided with a yoke. Wires of the coils 62 are respectively wound in approximately rectangular shape. The wound wires are opposed to the magnets 61, and are arranged within the magnetic field of the magnets 61. Four coils 62 are series-connected, and the both ends of the coils 62 are connected to the switching element 63. The coils 62 are curved along the rotational direction of the spool 12. In other words, the coils 62 are formed in a circular-arc shape. Also, the coils 62 are substantially concentrically arranged with the axis of the spool 12. Thus, an approximately constant space is produced between the coils 62 and the outer surfaces of the magnets 61. Accordingly, it is possible to constantly keep the gap between the coils 62 and the rotating magnets 61. The coils 62 are also mounted to an after-mentioned circuit board 70. The switching element 63 includes two field-effect transistors (FETs) 63a. For example, the FETs 63a are serial-connected, and are capable of performing a high-speed on-off control. The series-connected coils 62 are connected to drain terminals of the FETs 63a, respectively. The switching element 63 is also mounted to the circuit board 70.

For example, the rotation velocity sensor 41 is provided with a light-emitting/receiving typed photoelectric switch. The photoelectric switch includes a light emitter and a light receiver. A detection tubular portion 12c is integrally formed with the outer surface of the flange portion 12a of the spool 12. The detection tubular portion 12c is opposed to the circuit board 70. The detection tubular portion 12c includes a plurality of slits. The slits are arranged at predetermined intervals in the rotational direction of the tubular portion 12c. The light emitter and the light receiver of the rotation velocity sensor 41 are opposed to each other while the detection tubular portion 12c is interposed between the light emitter and the light receiver. The rotation velocity sensor 41 is configured to detect the rotation velocity of the spool 12 by means of the light passing through the slits.

The mode knob 43 is provided for selecting one of four brake modes. The brake modes are L-mode (long distance mode), M-mode (medium distance mode), A-mode (all-round mode), and W-mode (wind mode). After-mentioned first and second braking forces are set for each of the four brake modes. Here, the first braking forces for the four modes are different from each other. Also, the second braking forces for the four modes are different from each other.

The L-mode is used for performing super-long-distance surf-casting in a preferable downwind condition while the fishing line with low relative density and a heavy tackle with less air resistance (e.g., a spoon lure, a metal jig, and a vibration lure) are used. The L-mode is configured to prolong flying distance of the tackle by maximally using energy immediately after casting, maximally increasing the maximum number of rotations per unit time of the spool 12, and making the spool 12 almost freely rotates in the middle and subsequent stages of the casting. The first braking force of the L-mode is set to be the smallest in four brake modes.

The M-mode is used for comfortably perform normal long distance surf-casting with a tackle with less air resistance (e.g., a movable-centroid type plug, a pencil bait, and a vibration plug). The M-mode is configured to prolong flying distance of the tackle while overrun is inhibited immediately after casting and backlash is narrowly prevented by appropriately correcting the rotation of the spool 12 in the middle and subsequent stages of the casting. It is preferable to select the M-mode as the default mode when the polyamide resin fishing line with low relative density is used.

The A-mode is configured to maximally use energy immediately after casting, and prolong flying distance of the tackle in the later stage of the casting. Regardless of a sort of the fishing line, a sort of tackle, and a wind direction, the A-mode is allowed to be used in almost all conditions. Especially, it is preferable to set the A-mode as the default mode when the fluorocarbon fishing line with high relative density is used.

The W-mode is used for prolonging flying distance of the tackle by maximally inhibiting backlash even when the flying distance of the tackle may be shortened in a complete upwind condition. The second braking force of the W-mode is set to be the largest in the four brake modes. The W-mode is suitable for casting a predetermined type of tackle (e.g., a fixed-centroid type Minnow lure and a flatside crankbait) in an upwind condition. In this case, the predetermined type of tackle easily rotates in flying and accordingly slows down in flying. In addition, the W-mode is configured to reliably prevent backlash even in low-speed rotation of the spool 12 even in short-distance casting (e.g., pitching casting and skipping casting).

The mode knob 43 is rotatably mounted to the first side cover 6. The mode knob 43 is allowed to be positioned in four rotation phases corresponding to the above-mentioned four brake modes. The mode knob 43 is provided with a magnet (not illustrated in the figure). The circuit board 70 is provided with a mode knob position sensor 45. The mode knob position sensor 45 is made up of two hall elements. The hall elements are arranged in a circulation area of the magnet, and are separated from each other. The mode knob position sensor 45 detects the rotation phase of the mode knob based on a switching of the hall elements caused by passing of the magnet. Specifically, the switching state of the hall elements includes "a both-on state", "a one-on and the other-off state", and "a both-off state". An after-mentioned control unit 55 sets any of the brake modes to the detected rotation phase.

The spool control unit 42 includes the circuit board 70 and the control unit 55. The circuit board 70 is mounted to a surface of the spool support portion 13. The circuit board is opposed to the flange portion 12*a* of the spool 12. The control unit 55 (an example of a spool control portion) is mounted on the circuit board 70.

The circuit board 70 is a ring-shaped board. More specifically, the circuit board 70 includes a circular opening in its center, and is formed in a washer shape. The circuit board 70 is arranged on the outer peripheral side of the bearing accommodating portion 14. Also, the circuit board is arranged substantially concentrically with the spool shaft 20. The circuit board 70 is mounted to the spool support portion 13, and is allowed to relatively rotate with the spool support portion 13. Also, the circuit board 70 is positioned in a predetermined phase with respect to the opening 8*a*. Accordingly, even if the spool support portion 13 is attached to or detached from the opening 8*a* by its rotation, the circuit board 70 is arranged in a constant phase.

As described above, the circuit board 70 is mounted to the surface of the spool support portion 13 and is opposed to the flange portion 12*a* of the spool 12. Therefore, it is possible to directly attach the coils 62 to the circuit board 70 while the coils 62 are arranged on the surrounding of the rotor 60. Accordingly, it is not necessary to provide lead wires for connecting the coils 62 and the circuit board 70. As a result, it is possible to reduce chances of insulation failure between the coils 62 and the circuit board 70. Furthermore, the coils 62 are mounted to the circuit board 70 attached to the spool support portion 13. Therefore, when the circuit board 70 is mounted to the spool support portion 13, the coils 62 are simultaneously mounted to the spool support portion 13. Accordingly, it is possible to easily assemble the spool brake mechanism 25. Also, the circuit board 70 is relatively-rotatably mounted to the spool support portion 13. The circuit 70 is positioned in a predetermined phase with respect to the opening 8*a*. Therefore, the phases of the circuit board 70 and the reel unit 1 are not changed. Accordingly, even if a magnet is provided for the mode knob 43 mounted to the openable and closable first side cover 6 and hall elements are provided in the circuit board 70, the hall elements are always capable of detecting the magnet in the same positional relation.

For example, the control unit 55 is made up of a microcomputer including a CPU 55*a*, a RAM 55*b*, a ROM 55*c*, an I/O interface 55*d*, and the like. The ROM 55*c* (an example of a first braking force setting portion, a second braking force setting portion, and a tension setting portion) stores a control program and a variety of data to be used in after-mentioned two brake processing. For example, the variety of data relates to the first braking force, the second braking force, and timer value. The variety of data is correspondingly associated with the four brake modes, respectively. Furthermore, the ROM 55*c* stores a variety of setting values for reference tension and start tension in each brake mode. The control unit 55 is connected to the rotation velocity sensor 41 and the mode knob position sensor 45. As described above, the mode knob position sensor 45 is configured to detect the rotational position of the mode knob 43. Also, the control unit 55 is connected to gates of the FETs 63*a* of the switching element 63. The control unit 55 is configured to switch the switching element 63 of the spool brake unit 40 between on and off states with a predetermined signal based on inputs from the sensors 41 and 45 and an after-mentioned control program. For example, the predetermined signal is a pulse width modulation (PWM) signal with the cycle of $\frac{1}{1000}$ seconds. Specifically, the control unit 55 is configured to perform the on-off control of the switching element 63 with the duty cycle D in a selected brake mode. Here, the duty cycle D decreases in accordance with rotation velocity. The control unit 55 is provided with electric power from an electric storage element 57. The electric storage element 57 functions as a power source. The rotation velocity sensor 41 and a mode knob position sensor 45 are also provided with the electric power.

As described above, the electric storage element 57 functions as a power source. For example, the electric storage element 57 uses an electrolytic capacitor, and is connected to a rectifier circuit 58. The rectifier circuit 58 is connected to the switching element 63. The rectifier circuit 58 transforms alternating current from the spool brake unit 40 into direct current. Note that the spool brake unit 40 includes the rotor 60 and the coils 62, and functions as a power generator. In addition, the rectifier circuit 57 stabilizes voltage and provides the electric storage element 57 with the stabilized voltage.

The rectifier circuit 58 and the electric storage element 57 are also mounted on the circuit board 70. Elements (e.g., the coils 62) mounted on the circuit board 70 are covered with an insulator film 90. The insulator film 90 is made of synthetic resin insulator. The insulator film 90 is formed in a cylindrical shape with a brim. The insulator film 90 covers the coils 62, the circuit board 70, and electric components mounted to the circuit board 70. Note that the light emitter and the light receiver of the rotation velocity sensor 41 are exposed from the insulator film 90.

Operation and Motion of Reel in Fishing

In casting, the clutch lever 17 is pressed down, and the clutch mechanism 21 is switched to a clutch-off state. In the clutch-off state, the spool 12 is allowed to freely rotate. In casting, the fishing line is swiftly reeled out of the spool 12 by the weight of the tackle. When the spool 12 is rotated in casting, the magnets 61 rotate on the inner peripheral side of the coils 62. Then, when the switching element 63 is turned on, electric current flows through the coils 62. Accordingly, the spool 12 is caused to brake. In casting, rotation velocity of the spool 12 gradually increases, but gradually decreases after it reaches a peak.

When the tackle lands on water, an angler rotates the handle 2 in the line-winding direction. Accordingly, the clutch mechanism 21 is switched to the clutch-on state by the clutch return mechanism (not illustrated in the figure). Then, the angler waits for the fish to bite while holding the reel unit 1.

Control Operation of Control Unit

Figure 4:
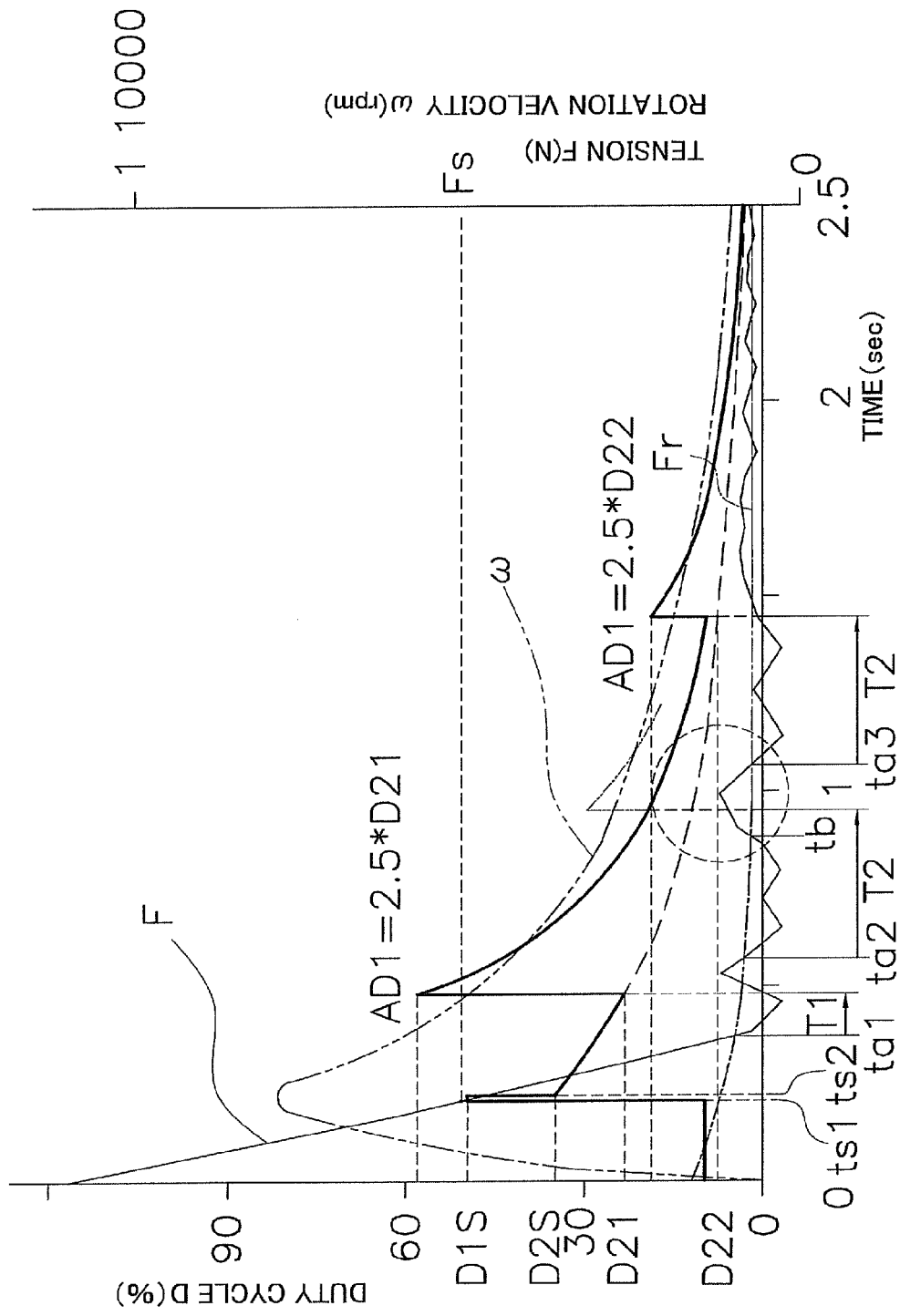
FIG. 4 is a chart for explaining a braking operation performed by the spool brake device.

Next, a schematic brake control operation of the control unit 55 in casting will be hereinafter explained with reference to FIG. 4. In FIG. 4, tension F, rotational velocity ω, and duty cycle D for indicating intensity of braking force are shown in the vertical axis while elapsed time since casting is shown in the horizontal axis. Also, the duty cycle to be actually controlled (i.e., braking force) is shown with a bold solid line.

When casting is started and the control unit 55 is powered on, the control unit 55 sets the following depending on the position of the mode knob 43: first initial braking force (duty cycle D1S) of after-mentioned first brake processing in accordance with a brake mode; second initial braking force (duty cycle D2S) of after-mentioned second braking processing; predetermined scale factor MP (e.g., within the range of 1.2 to 2.5) of the second braking force; damping rate RA (e.g., 0.2 to 0.6) of the second braking force; and value of timer TN (e.g., within the range of 0.05 to 0.5 seconds) when braking is corrected. In addition, the control unit 55 sets reference tension Fr and start tension Fs. The reference tension Fr is used as a reference with respect to detected tension F. The start tension Fs determines the starting point of braking. In an example of FIG. 4, the scale factor of the second braking force AD1 is set to be 1.5.

Next, the control unit 55 reads the rotation velocity ω from the rotation velocity sensor 41, and computes tension F based on the rotation velocity ω.

It is possible to compute the tension F by inertia moment J of the spool 12 and change rate (Δω/Δt) of the rotation velocity of the spool 12. When the rotation velocity of the spool 12 is changed during casting, the changed rotation velocity will be different from the rotation velocity of the spool 12 independently and freely rotating without receiving tension from the fishing line. This is caused by the rotation driving force (i.e., torque) generated by the tension from the fishing line. Here, if the change rate of the rotation velocity is set to be "Δω/Δt," driving torque T will be expressed by the following equation (1).

$$T = J \times (\Delta\omega/\Delta t) \qquad \text{Equation (1)}$$

If the driving torque T is computed by the equation (1), it is possible to compute tension based on the radius (normally 15 to 20 mm) of a point of action of the fishing line.

If strong braking force is applied to a spool when tension with a property of gradually decreasing after the start of casting becomes equal to or less than a predetermined value (i.e., start tension Fs), a tackle flips its posture and stably flies before the spool's rotation velocity reaches the peak. This was actually confirmed. The following control is performed for flying the tackle with a stable posture by braking the spool before the spool's rotation velocity reaches the peak. Specifically, first brake processing is performed for flipping the tackle by applying strong braking force D1S to the spool 12 for a short period of time in the beginning of casting. Subsequently, the spool 12 is gradually caused to brake with the combination of the gradually decreasing first braking force and the second braking force until the rotation velocity of the spool 12 is reduced to a predetermined rotation velocity ωe. Here, the first braking force (D2) decreases from the braking force at the start of braking in proportion to the square of the rotation velocity of the spool 12. Also, the second braking force decreases with damping rate generated based on a default value obtained by multiplying the first braking force by a predetermined scale factor MP.

The control unit 55 performs both of the first and second brake processing. In the second brake processing, the reference tension Fr and the detected tension F are compared. Note that the reference tension Fr is configured to be at least temporarily decrease over time. When the detected tension F becomes equal to or less than the reference tension Fr, the spool 12 is caused to brake with the second braking force. The second braking force is generated by multiplying the first braking force by the scale factor MP. The second braking force decreases in accordance with the damping rate RA. Specifically, the timer TN (N=1, 2, 3 . . . ) is activated every time the detected tension F becomes equal to or less than the reference tension Fr. When the timer TN finishes counting, the spool 12 is caused to brake with second braking force AD1. Here, the second braking force AD1 is generated by multiplying the first braking force D2 by the scale factor MP when the timer TN finishes counting. Also, when the detected tension F exceeds the reference tension Fr before the timer TN finishes counting, the timer TN is reset. Thus, the spool 12 is not caused to brake with the second braking force AD1.

In an example of FIG. 4, when the detected tension F becomes equal to or less than the reference tension Fr in time ta1, the timer T1 starts counting. In this case, the detected tension F continues to be equal to or less than the reference tension Fr until the timer T1 finishes counting. Accordingly, when the timer T1 finishes counting, the spool 12 is caused to brake with the second braking force AD1 generated by multiplying the first braking force D21 by the scale factor MP at that moment.

Also, the detected tension F also becomes equal to or less than the reference tension in time ta2. However, as illustrated within a dotted circle in FIG. 4, the detected tension F exceeds the reference tension Fr in time tb before the timer T2 finishes counting up. Therefore, brake of the spool 12 with the second braking force is cancelled. Furthermore, the detected tension F becomes equal to or less than the reference tension Fr in time ta3 again, and the condition is continued until the timer T2 finishes counting. Therefore, the spool 12 is caused to brake with the second braking force AD1 (=2.5×D21) when the timer T2 finishes counting. The second braking force is reduced with the damping rate RA over time. Here, the second braking force AD1 does not become equal to or less than the first braking force D2.

Figure 5:
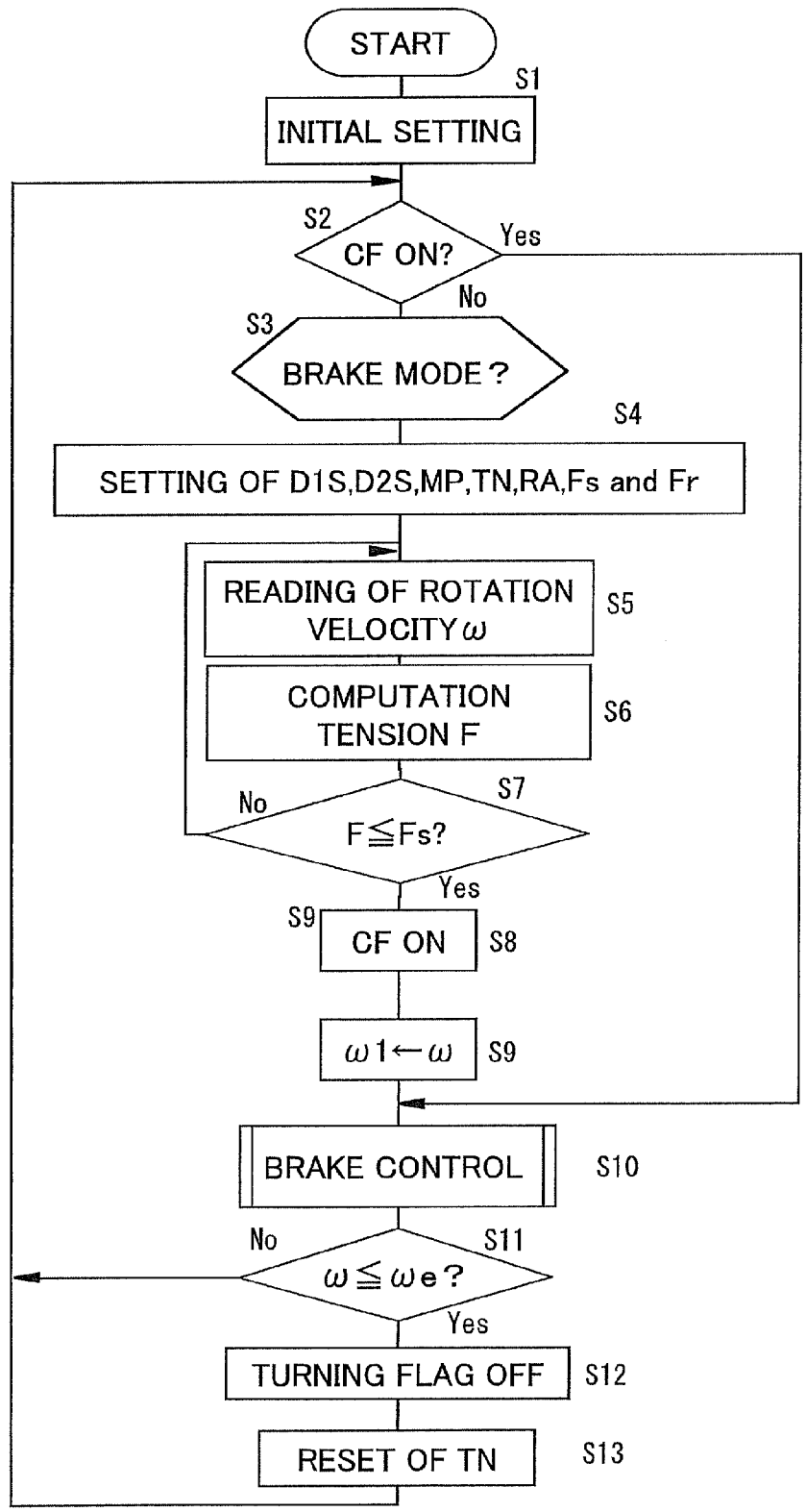
FIG. 5 is a flowchart for illustrating the main routine of the control operation.

Next, specific control processing will be hereinafter explained with reference to control flowcharts of FIGS. 5 and 6.

In casting, the spool 12 rotates and electric power is accordingly stored in the electric storage element 57. Then, the control unit 55 is powered on, and an initial setting is performed in Step S1. Also, a variety of flags and variables is reset. For example, variable N relates to the number of times that the timer TN is activated. In the initial setting, the variable N is set to "1." In Step S2, it is judged if a flag CF is turned on. The flag CF indicates if after-mentioned control processing is started. If the control processing is not being started yet, Step S3 is performed. In Step S3, it is judged which of the brake modes is detected by the mode knob position sensor 45. An arbitrary brake mode will be hereinafter described as "BMn" (n=1, 2, 3, and 4). In Step S4, the actual brake mode is set to the selected brake mode BMn. Specifically, a variety of values corresponding to the selected brake mode BMn is read out of the ROM 55c in the control unit 11 and is set for the RAM 55b. For example, the variety of values includes the initial braking force D1S in the first brake processing, the initial first braking force D2S in the second brake processing, increasing rate MP of the second braking force, timer values of the timers TN, the damping rate RA of the second braking force, and the reference tension Fr used for braking with the second braking force. In this case, the initial braking force D1S is the duty cycle when the rotation velocity of the spool 12 in the initial period of casting is 10,000 rpm. Therefore, the initial braking force D1S is corrected in accordance with the rotation velocity of the spool 12 in the initial period of casting. A single or plurality of Timers TN (N is positive integer) are sequentially activated when the spool is caused to brake with the second braking force in the second brake processing. For example, timer T1 is activated before timer T2 is activated. Also, timer values of the timers TN are configured to be sequentially longer. For example, the timer value of the timer T1 is set to 0.05 seconds, and the timer value of the timer T2 is set to 0.1 seconds.

In Step S5, the rotation velocity ω of the spool 12 is detected based on a pulse from the rotation velocity sensor 41. In Step S6, tension F applied to the fishing line reeled out of the spool 12 is computed with the rotation velocity ω based on the above-mentioned equation.

In Step S7, it is judged if the calculated tension F is equal to or less than the start tension Fs (e.g., any of the values ranging from 0.5 to 1.5 N). If the calculated tension F exceeds the start tension Fs, Step S5 will be performed again.

If the tension F becomes equal to or less than a predetermined value Fs, Step S8 is performed. In Step S8, Flag CF is turned on. In Step S9, the rotation velocity ω most-recently detected in Step S5 is set for the rotation velocity ω1 in the initial period of casting. In Step S1, brake processing illustrated in FIG. 6 is performed. In Step S11, it is judged if the detected rotation velocity ω reaches end velocity ωe. The end velocity ωe is very low velocity for ending the control. If the rotation velocity ω reaches the end velocity ωe, all the flags are turned off in Step S12. Then, in Step S13, all the timer values of the timers TN are reset. Then, Step S2 will be performed again. However, when casting is finished and the spool 12 accordingly stops rotating, voltage of the power source is reduced and the electric storage element 57 is discharged. Therefore, the CPU 55a of the control unit 55 is reset.

If the flag CF is turned on in Step S2 and brake processing is already started, Step S10 is subsequently performed.

Figure 6:
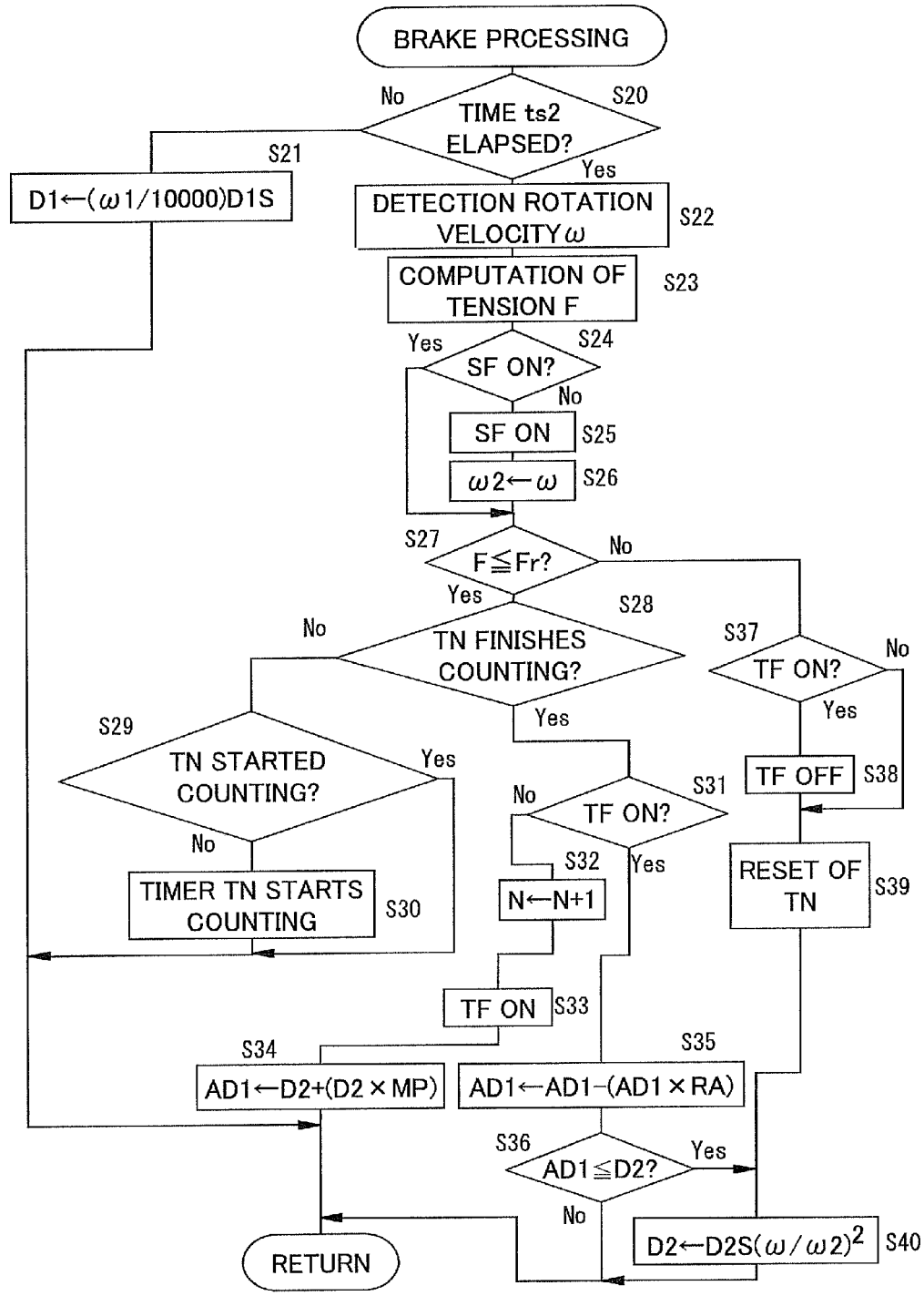
FIG. 6 is a flowchart for illustrating a braking process routine of the control operation.

As described above, Step S10 is brake processing, and is illustrated in FIG. 6 in detail. In Step S20 of FIG. 6, it is judged if time ts2 is elapsed after the detected tension F becomes equal to or less then the predetermined value Fs. If the time ts2 is not elapsed yet, the first brake processing is performed in Step S21. Then, Step S11 is performed. As illustrated in FIG. 4, in the first brake processing in Step S21, the initial braking force D1S set in Step S4 is corrected in accordance with the rotation velocity ω1 in the initial period of casting, and the spool 12 is caused to brake with constant braking force until time ts2 is elapsed.

If time ts2 is elapsed since the beginning of braking in Step S20, the second brake processing is performed in Step S22. In Step S22, the rotation velocity ω is detected. In Step S23, tension F is computed. In Step S24, it is judged if the flag SF is turned on. The flag SF is used for judging if the second brake processing is already started. If the flag SF is not turned on yet, the flag SF is turned on in Step S25. In Step S26, the rotation velocity ω detected in Step S22 is set for the initial rotation velocity ω2 in the second brake processing. If the flag SF is already turned on in Step S24 (i.e., if the second brake processing is already started), Step S27 is performed.

In Step S27, it is judged if the detected tension F becomes equal to or less than the reference tension Fr. If the detected tension F is equal to or less than the reference tension Fr, Step S28 is performed for braking the spool 12 with the second braking force. In Step S28, it is judged if the timer TN (e.g., first timer is timer T1) already finishes counting. If the timer TN does not finish counting yet, it is judged if the timer TN is already activated in Step S29. If the timer TN is not activated yet, the timer TN is activated in Step S30. Then, Step S11 in the main routine is performed. On the other hand, if the timer TN is already activated, Step S11 in the main routine is performed without performing Step S30.

If the timer TN already finishes counting in Step S28, Step S31 is performed. In Step S31, it is judged if the flag TF is turned on. Here, the flag TF indicates that the brake correction processing is performed when the detected tension F becomes equal to or lower than the reference tension Fr for the first time. If the flag TF is not turned on yet, this means that the brake correction processing is the first one. Then, variable N is incremented by one for preparing the next timer TN (e.g., timer T2) in Step S32. Next, the flag TF is turned on in Step S33, and the second braking force AD1 is set in Step S34. Then, Step S11 in the main routine is performed. The second braking force AD1 is generated as illustrated in FIG. 4. Specifically, the first braking force D2 when the timer TN finishes counting is multiplied by the scale factor MP (e.g., 1.5), and then the multiplied first braking force D2 is added to the first braking force D2.

If the flag TF is already turned on in Step S31, damping processing of the second braking force AD1 is performed in Step S35. Specifically, the second braking force AD1 at the moment is multiplied by a predetermined damping rate RA, and then the multiplied second braking force AD1 is subtracted from the second braking force AD1. Thus obtained value is set for a new second braking force AD1. Is Step S36, it is judged if the damped second braking force AD1 is equal to or less than the first barking force D2 for preventing the second braking force AD1 from being less than the first braking force D2. If the second braking force AD1 is equal to or less than the first braking force D2, the braking processing is performed with the first braking force D2 in Step S40.

On the other hand, if the detected tension F exceeds the reference tension Fr in Step S27, Step S37 is performed. In Step S37, it is judged if the flag TF is turned on. In other words, it is judged if the brake correction processing is already performed. If the brake correction processing is already performed, the flag TF is turned off in Step S38. On the other hand, if the brake correction processing is not performed yet, Step 39 is performed without performing Step S38. In Step S39, the timer value of the timer TN is reset (i.e., initialized). Thus, when the detected tension F exceeds the reference tension Fr before the timer TN is reset, the brake processing with the second braking force is cancelled by preventing the timer TN from finishing counting.

In Step S40, the brake processing is performed with the first breaking force. Then, Step S11 in the main routine is performed. In the braking processing with the first braking force, the spool 12 is caused to brake with the duty cycle (D2=D2S (ω/ω2)$^2$). Here, the duty cycle is generated by reducing the second initial braking force D2S by the square of the rotation velocity.

In this case, if the detected tension F exceeds the reference tension Fr, the spool 12 is caused to brake with the weak first braking force D2. On the other hand, if the detected tension F becomes equal to or less than the reference tension Fr, the spool 12 is caused to brake with the strong second braking force AD1 generated by multiplying the first braking force D2 by the scale factor MP. Therefore, the strength of the braking force is automatically controlled in accordance with a fishing condition. Accordingly, even if a fishing condition is changed to some extent, it is not necessary to reset the strength of the braking force.

OTHER EXAMPLE EMBODIMENTS

Example Embodiment (a)

In the above-mentioned embodiment, tension to be applied to the fishing line is computed based on the rotation velocity of the spool. However, tension may be directly detected by attaching a strain gauge to the spool shaft, for instance.

Example Embodiment (b)

The above-mentioned embodiment discloses the spool brake unit for braking the spool by power generation. However, the spool brake unit may have any configuration as long as it is electrically controllable unit. For example, the spool brake unit may be configured to press a brake shoe or a brake pad against a drum or a disk by means of an electrically controllable actuator.

Example Embodiment (c)

In the above-mentioned embodiment, the spool is caused to brake with the second braking force gradually damped over time in the second brake processing. However, the spool may be caused to brake with constant second braking force for a predetermined period of time. Also, the second braking force may be damped in accordance with the square of the rotation velocity.

Example Embodiment (d)

In the above-mentioned embodiment, the spool is caused to brake by the first and second brake processing. The first brake processing is configured to brake the spool with constant braking force, and the second brake processing is configured to brake the spool with changing braking force. However, the present invention is not limited to this. The spool may be caused to brake only by the second brake processing.

Example Embodiment (e)

In the above-mentioned embodiment, the electrically controllable spool brake mechanism 25 brakes the spool with the combination of the first and second braking force. However, the present invention is not limited to this.

Figure 7:
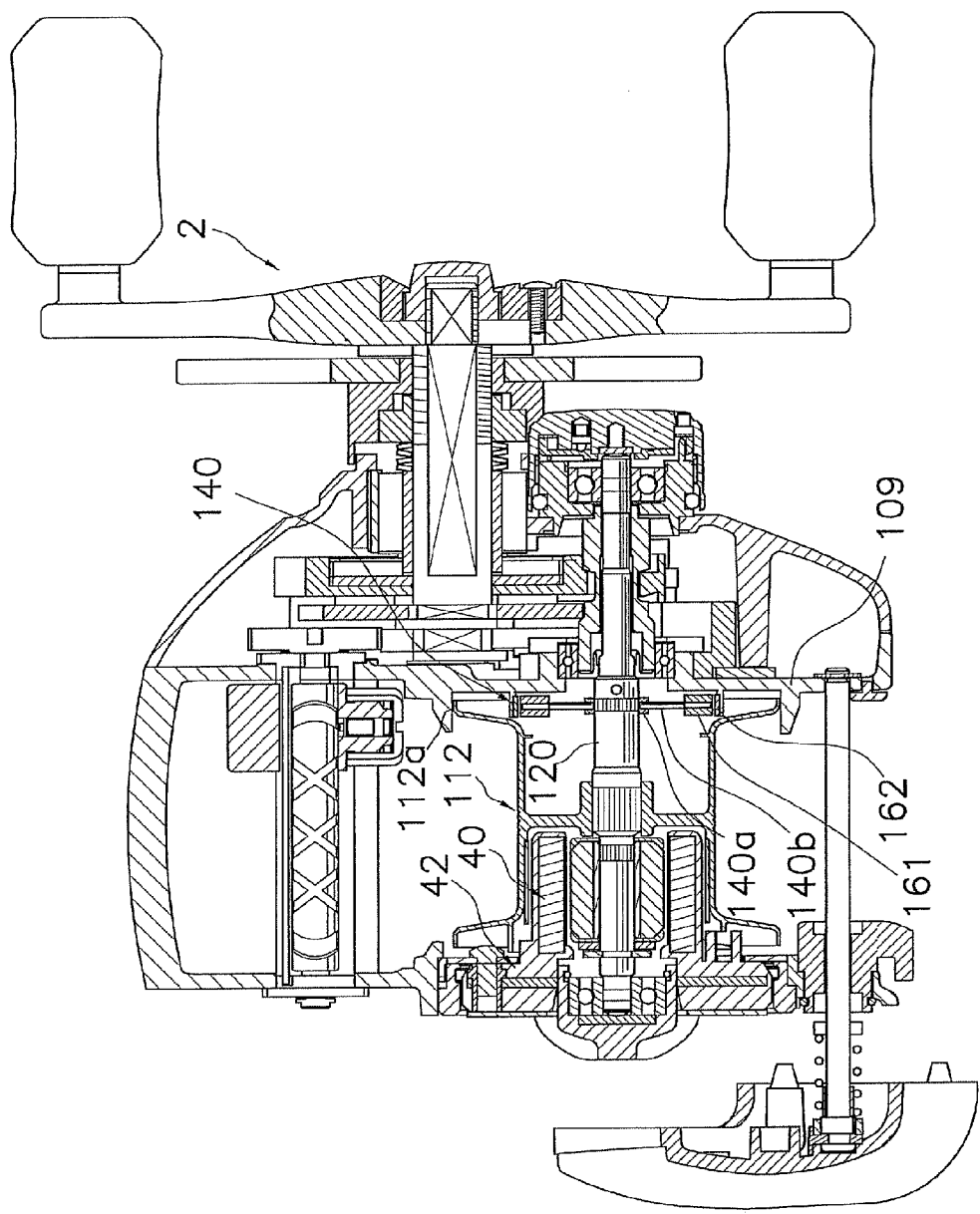
FIG. 7 is a cross-sectional view for illustrating the internal structure of a reel unit of the dual-bearing reel that another embodiment is applied, and corresponds to FIG. 2.

For example, as illustrated in FIG. 7, a spool brake unit 140 (an example of second spool brake portion) may be mounted to a side plate 109 and a flange portion 112a of the spool 112 on the hand 2 attachment side. Here, the spool brake unit 140 is a mechanical centrifugal brake typed unit with use of the centrifugal force. The spool 112 may be caused to brake by the spool brake unit 140 and a spool brake unit 40 (an example of a first spool brake portion). The spool brake unit 140 includes a plurality of (e.g., six) brake shoes 161 and a brake drum 162. The brake shoes 161 are capable of integrally rotating with the spool 112. The brake drum 162 is mounted to the side plate 109. The brake drum is arranged on the outer peripheral side of the brake shoes 161. The brake shoes 161 are allowed to make contact with the brake drum 162. The brake shoes 161 are mounted to a plurality of (e.g., six) stepped guide shafts 140b. The brake shoes 161 are capable of radially moving along the guide shafts 140b. The guide shafts 140b are mounted to and protruded from a mounting tubular portion 140a. The mounting tubular portion 140a is fixed to the outer peripheral surface of the spool shaft 120 with a predetermined coupling method (e.g., a serration coupling). When the brake shoes 161 and the spool 112 rotate, the centrifugal force is generated. Thus, the braking shoes 161 make contact with the brake drum 162, and thus the spool brake unit 140 brakes the spool 112 with the first braking force decreasing in proportion to the square of the rotation velocity of the spool 112.

Also, configurations of the spool brake unit 40 and the spool control unit 42 in the example embodiment (e) are almost the same as those of the above-mentioned embodiment. However, in the example embodiment (e), the spool control unit 42 controls the spool brake unit 40 only when the detected tension becomes equal to or less than the reference tension, and thus the spool 112 is caused to brake with the second braking force. In other words, in the example embodiment (e), the spool 112 is constantly caused to brake by the spool brake unit 140 during casting, and the spool 112 is caused to brake by applying the second braking force only when the detected tension becomes equal to or less than the reference tension. Also, the second braking force applied under the control of the spool brake unit 42 may be the same as or different from that in the above-mentioned embodiment. For example, the second braking force may be applied only in a predetermined period of time.

Example Embodiment (f)

In the above-mentioned embodiment, a plurality of reference tensions may be set depending on a plurality of first braking forces.

General Interpretation

A used herein, the following directional terms "forward, rearward, above, downward, vertical, horizontal, below and transverse" as well as any other similar directional terms refer to those directions of a device equipped with the present invention. Accordingly, these terms, as utilized to describe aspects of the present invention, should be interpreted relative to a device equipped with the present invention.

The term "configured" as used herein to describe a component, portion or part of a device includes hardware and/or software that is constructed and/or programmed to carry out the desired function.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applied to words having similar meanings such as the terms, "including," "having," and their derivatives. Also, the term "part," section," "portion," "member," or "element" when used in the singular can have the dual meaning of a single part or a plurality of parts.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spool brake device of a dual-bearing reel configured to brake a spool that is rotatably mounted to a reel unit and arranged to wind a fishing line around the periphery surface thereof, the spool brake device comprising:
    a spool brake member being configured to electrically-controllably brake the spool;
    a first braking force setting element being configured to set first braking force;

a tension setting element being configured to set a reference tension;

a tension detection member being configured to detect tension to be applied to the fishing line;

a second braking force setting element being configured to set second braking force by multiplying the first braking force by a predetermined scale factor; and a spool control component being configured to control the spool brake member with the first brake force at the start of braking, the spool control component being configured to control the spool brake member with the second braking force when tension detected by the tension detection member becomes equal to or less than the reference tension after the start of braking.

2. The spool brake device according to claim 1, further comprising a timer configured to start counting when the detected tension becomes equal to or less than the reference tension.

3. The spool brake device of a dual-bearing reel according to claim 2, wherein the spool control component is configured to control the spool brake member with the second braking force when the timer finishes counting.

4. The spool brake device according to claim 3, wherein after casting a first timer value counted by the timer is less than subsequent timer values counted by the timer.

5. The spool brake device according to claim 2, further comprising a damping rate setting portion being configured to set temporal damping rate of the second braking force.

6. The spool brake device according to claims 5, wherein the spool control component is configured to reduce the second braking force at the set damping rate in accordance with time to be elapsed after the timer finishes counting.

7. The spool brake device according to claims 1, further comprising a velocity detection member configured to detect rotational velocity of the spool.

8. The spool brake device of a dual-bearing reel according to claim 7, wherein the spool control component is configured to reduce the first braking force in conjunction with reduction of the rotational velocity detected by the velocity detection member.

9. The spool brake device according to claim 8, wherein the spool control component is configured to reduce the first braking force in proportion to the square of the detected rotational velocity.

10. The spool brake device according to claim 9, wherein the spool control component is configured to reduce the reference tension in conjunction with reduction of the detected rotational velocity.

11. The spool brake device according to claim 1, wherein the spool control component is configured to start controlling the spool brake member when the detected tension becomes equal to or less than a predetermined value.

12. The spool brake device according to claim 1, wherein the first braking force setting element and the second braking force setting element are capable of setting a plurality of first braking forces and a plurality of second breaking forces, respectively, the plurality of first braking forces being different from each other, the plurality of second braking forces being different from each other.

13. The spool brake device according to claim 12, further comprising a braking force selection portion being configured to select one of a plurality of combinations formed by selecting one of the plurality of first braking forces and one of the plurality of second braking forces.

14. The spool brake device according to claim 12, wherein the reference tension setting element is capable of setting a plurality of reference tensions depending on the plurality of first braking forces.

15. A spool brake device of a dual-bearing reel configured to brake a spool that is rotatably mounted to a reel unit and arranged to wind a fishing line around the periphery surface thereof, the spool brake device comprising:

a first spool brake member being configured to brake the spool with a first braking force in conjunction with rotation per unit time of the spool;

a second spool brake member being configured to brake the spool with electrically-controllable second braking force;

a tension setting element being configured to set reference tension;

a tension detection member being configured to detect tension to be applied to the fishing line;

a second braking force setting element being configured to set a second braking force generated by multiplying the first braking force by a predetermined scale factor; and a spool control component being configured to control the second spool brake member with the second brake force when tension detected by the tension detection member becomes equal to or less than the reference tension.

16. The spool brake device according to claim 15, wherein the first spool brake member includes a brake shoe and a brake drum, the brake shoe being capable of integrally rotating with the spool, the brake shoe being capable of radially moving outward by means of centrifugal force to be generated by rotation of the spool, the brake drum being arranged on the outer peripheral side of the brake shoe in the reel unit, the brake drum being capable of making contact with the brake shoe.

* * * * *